United States Patent
Anderson et al.

(10) Patent No.: US 9,495,397 B2
(45) Date of Patent: Nov. 15, 2016

(54) SENSOR ASSOCIATED DATA OF MULTIPLE DEVICES BASED COMPUTING

(71) Applicant: INTEL CORPORATION, Santa Clara, CA (US)

(72) Inventors: Glen J. Anderson, Beaverton, OR (US); Richard P. Crawford, Davis, CA (US); Audrey C. Younkin, Hillsboro, OR (US); Giuseppe Raffa, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 121 days.

(21) Appl. No.: 13/797,981

(22) Filed: Mar. 12, 2013

(65) Prior Publication Data

US 2014/0280137 A1 Sep. 18, 2014

(51) Int. Cl.
*G06F 17/30* (2006.01)

(52) U.S. Cl.
CPC ..... *G06F 17/30309* (2013.01); *G06F 17/3071* (2013.01); *G06F 17/30864* (2013.01)

(58) Field of Classification Search
None
See application file for complete search history.

(56) References Cited

U.S. PATENT DOCUMENTS

| | | | |
|---|---|---|---|
| 8,521,742 B2* | 8/2013 | McGowan et al. | 707/737 |
| 8,730,040 B2* | 5/2014 | Donovan et al. | 340/540 |
| 8,819,850 B2* | 8/2014 | Chien | 726/28 |
| 8,904,279 B1* | 12/2014 | Bougon | H04L 67/02 |
| | | | 705/51 |
| 2004/0230797 A1* | 11/2004 | Ofek | G06F 21/14 |
| | | | 713/168 |
| 2005/0259845 A1* | 11/2005 | Dehlin | G06F 3/002 |
| | | | 382/103 |
| 2006/0262012 A1 | 11/2006 | Nishikata et al. | |
| 2008/0046463 A1 | 2/2008 | Haller | |
| 2008/0057911 A1 | 3/2008 | Lauper | |
| 2009/0046856 A1* | 2/2009 | Mitchell | G09C 5/00 |
| | | | 380/243 |
| 2010/0100551 A1* | 4/2010 | Knauft | G06F 17/30616 |
| | | | 707/741 |
| 2011/0071971 A1 | 3/2011 | Parks et al. | |
| 2011/0191787 A1 | 8/2011 | Poleg et al. | |
| 2012/0222083 A1 | 8/2012 | Vaha-Sipila et al. | |

(Continued)

FOREIGN PATENT DOCUMENTS

| | | |
|---|---|---|
| JP | 2005245833 | 9/2005 |
| JP | 2012247840 | 12/2012 |

OTHER PUBLICATIONS

International Search Report and Written Opinion mailed May 30, 2014 for International Application No. PCT/US2014/016718, 18 pages.

(Continued)

*Primary Examiner* — Rehana Perveen
*Assistant Examiner* — Raheem Hoffler
(74) *Attorney, Agent, or Firm* — Schwabe, Williamson & Wyatt, P.C.

(57) ABSTRACT

Computer-readable storage media, apparatus and method associated with storing a copy of local data in a historical data store, among other embodiments, are disclosed herein. In embodiments, one or more computer-readable storage media may contain instructions which when executed by a computing device may provide access of local data to one or more applications on the computing device for contemporaneous processing by the one or more applications. The local data may be associated, at least in part, with one or more sensors of the computing device. In some embodiments, a copy of the local data may be transmitted to a remote historical data store where it may be categorized and correlated with data from computing devices associated with one or more other users for further processing.

25 Claims, 4 Drawing Sheets

(56) References Cited

U.S. PATENT DOCUMENTS

2012/0310746 A1    12/2012  Zhao et al.
2013/0036115 A1*    2/2013  Schwarz et al. .............. 707/736
2013/0159350 A1*    6/2013  Sankar et al. ................ 707/784
2013/0208893 A1*    8/2013  Shablygin et al. ........... 380/277
2014/0013451 A1*    1/2014  Kulka .................... G06F 21/14
                                                            726/29

OTHER PUBLICATIONS

International Preliminary Report on Patentability mailed Sep. 24, 2015 for International Application No. PCT/US2014/016718, 13 pages.

Office Action mailed Aug. 9, 2016 for Japanese Application No. 2015-558183, 9 pages.

* cited by examiner

SENSOR ASSOCIATED DATA OF MULTIPLE DEVICES BASED COMPUTING

TECHNICAL FIELD

Embodiments of the present disclosure are related to the field of data processing, and in particular, related to sensor associated data of multiple devices based computing.

BACKGROUND

The number of sensors which generate data on computing devices is continually increasing. In response, the amount of data handled by computing devices is also increasing. Some of this data may be used by applications executing on the computing devices, while other portions of the data may go unused. Regardless of whether the data is used or not, under the current state of the art, the data is ultimately discarded along with a great deal of information carried by the data.

DETAILED DESCRIPTION OF ILLUSTRATIVE EMBODIMENTS

Computing devices associated with a data agent and historical data store are described herein, among other embodiments. In embodiments, a computing device may comprise a plurality of sensors, one or more memory modules, a communication module, and a data agent. The data agent may be configured to provide access, to one or more applications executing on the computing device, to data received from the plurality of sensors. In embodiments, the data agent may periodically transmit a copy of the data from the plurality of sensors to a remote historical data store where it may be categorized and/or correlated with data from other computing devices associated with the same user or one or more other users for further processing. The categorized and/or correlated data may be made available for further analysis. For example, a computing device may be a smart phone, a sensor may be a camera, and the historical data store may be a database.

In the following detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
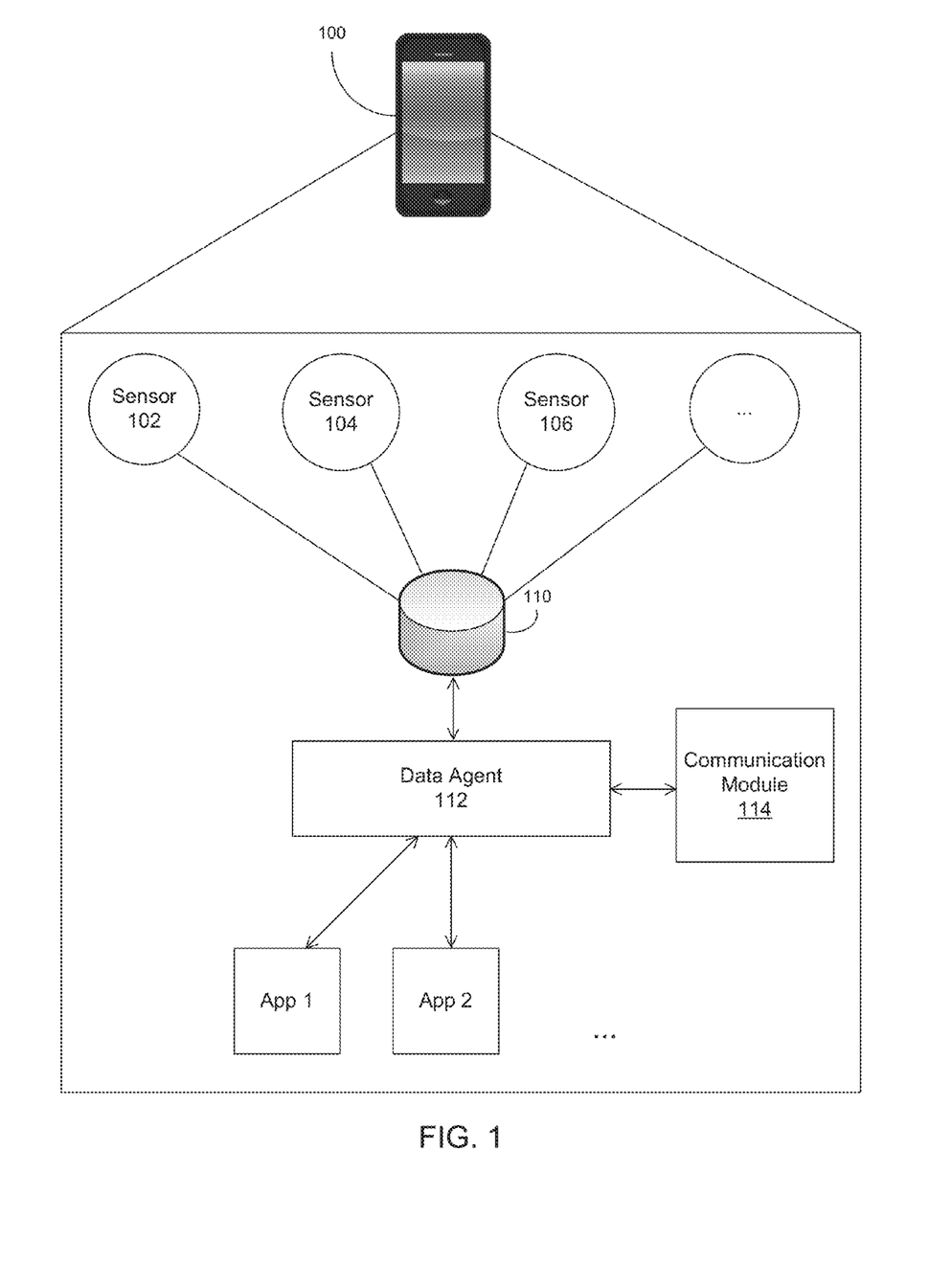
FIG. 1 depicts the interaction of components of an illustrative computing device, according to some embodiments of the present disclosure.

FIG. 1 depicts the interaction of components of an illustrative computing device 100, according to some embodiments of the present disclosure. Computing device 100, in some embodiments, may be comprised of a number of sensors, 102-106, local data store 110, data agent 112, communication module 114 and one or more applications, such as App 1 and/or App 2, which may be executing on the computing device.

Sensors 102-106, may be any type or combination of sensors including physical sensors and/or virtual/soft sensors. Physical sensors may include, but are not limited to, a camera, microphone, touch sensor, global positioning system (GPS), accelerometer, gyroscope, altimeter, pressure sensitive sensors, or signal related sensors, such as infrared, Bluetooth, or Wi-Fi. Virtual/soft Sensors may, in part, monitor a user's behavior and may include, but are not limited to, sensors that monitor applications installed and/or used, browser navigation history, searches conducted, network activity, charging activity, input activity, or the like. Virtual/soft sensors may also include sensors that develop data indirectly for example, a location sensor that utilizes map information and knowledge of wireless network signal signatures, such as Wi-Fi, along with the strength of the signal to determine a user's location. These examples are not meant to be exhaustive and are merely meant to provide a sampling of possible sensors. Any sensor capable of producing data that may be used by a computing device is contemplated. In some embodiments, each sensor may collect an associated form of data and provide it to local data store 110 for storage.

Local data store 110 may contain working data that, in some embodiments, may be a snapshot of the data available on the computing device at any given point in time, or period of time. In some embodiments, the working data may be comprised of the data provided by sensors 102-106, data derived from an analysis and/or fusion of data, or subset of data, from more than one sensor of the data provided by sensors 102-106, and/or other data.

The data derived from an analysis and/or fusion of data provided by sensors 102-106 may be any data not directly provided by one of sensors 102-106. For example, the data produced from a camera of computing device 100 may be processed to derive facial expressions of the one or more users of computing device 100. Examples of derived data may include, but are not limited to, facial expressions, gestures, eye tracking, voice commands, whether the user may currently be talking with someone, ambient noises, user activities, mode of transportation, etc. This derived data may, in some embodiments, come from middleware processing, not depicted herein, wherein the data may be processed prior to, or in conjunction with, the storage of the data provided by the sensors in local data store 110. In other embodiments, this derived data may be generated by one or more applications executing on computing device 100. An example of data that may be fused from more than one sensor may be data representing the physical orientation of a device, which may be arrived, for instance, by utilizing a fusion of data from an accelerometer, a gyroscope, and a compass.

Other data may be any data available to the computing device that may not be associated with, or derived from, a sensor of computing device 100. For example, this data may be entered by a user into computing device 100 such as entries into the user's calendar or text messages sent and/or received by the user or data otherwise received by computing device 100, such as the user's emails etc.

At least a portion of the working data may be needed by one or more applications executing on computing device 100, such as App 1 and/or App 2, for the applications to properly function. For instance, if App 1 were a gesture game, it may need access to data provided by a touch sensor or the camera of computing device 100 in order to determine the gestures of one or more users of computing device 100 and properly function.

While some of the working data may be necessary for an application to properly function, the data required by each application may vary and/or some of the working data may be sensitive in nature. In light of these considerations, it may be necessary to restrict the access that each application has to the working data. In some embodiments data agent 112 may, in part, act to restrict the access that each application has to the data based upon data acquisition rights associated with the respective application. As discussed further in reference to FIG. 2, data agent 112 may also act to upload working data to a historical data store for further processing.

In some embodiments, this data restriction may be accomplished by implementing data agent 112 as an intermediary between local data store 110 and the applications that may need access to the working data contained in local data store 110. In these embodiments, data agent 112 may act as a gate keeper to the working data by only allowing each application access to the data associated with the respective data acquisition rights of each application. In other embodiments, data agent 112 may have direct access to the data streams from each individual sensor and may act as a filter by allowing access by each application directly to the necessary data streams based upon the applications respective data acquisition rights. Enabling direct access to the data streams may be beneficial where the applications processing is time sensitive. For example, it may be beneficial to provide a navigation application with direct access to the GPS data stream to ensure that coordinates may be processed as fast as possible, this may give a user a greater amount of time to respond to the directions generated by the navigation application. In these embodiments, data agent 112 may still act as an intermediary between the application executing on computing device 100 and any data stored in local data store 110. In addition, the data streams from the sensors may also be directed to local data store 110 for further processing.

In some embodiments, an application may only need access to a subset of the data provided by one or more of the sensors. In these scenarios it may be beneficial to provide the application a portion, summary, and/or obfuscation of the sensor data. Some of the benefits of allowing access to only a portion, summary, and/or obfuscation of sensor data may include protecting the privacy of the user and restricting access to data that may be considered more valuable or may be more difficult to collect.

In some embodiments, an application executing on computing device 100 may only need a portion of data provided by a sensor. For example, an application, such as a localization application or service, may only need access to a certain range of frequencies from a microphone. In such an instance, the localization application or service may only need access to frequencies above an audible and/or vocal range and the data acquisition rights associated with the application may enable the application to only receive that range of frequencies to preserve the privacy of a user, for example. This may be accomplished through middleware processing internal to the data agent 112, through another middleware application, or through a hardware mechanism of computing device 100 that may work to filter out the other frequencies.

In other embodiments, where the application executing on the computing device only needs access to a portion of the data, it may be necessary to obfuscate the data that may not be needed. For example, where an application needs to interpret facial expressions to properly function, the application's data acquisition rights may be restricted to an obfuscated version of the data that only contains the facial representations. In these embodiments, a middleware application, such as data agent 112 or another middleware application, may process one or more images from the camera. The middleware may determine the location of faces in the image and may act to obfuscate the remaining portions of the one or more images.

In still other embodiments, the application executing on the computing device may not need access to the raw data from the sensors, but rather a summary of the data. For example, in a gesture based game where the gestures may be input through a camera, the application may only need access to a wire frame representation of the user and the data acquisition rights may limit access to this wire frame representation. Under this example, a middleware application, such as data agent 112 or another middleware application, may process the raw data from the camera and may submit only the wire frame to the application.

The data acquisition rights may be acquired in a number of ways. For example, where data agent 112 may be provided by the provider of the computing device platform, the data acquisition rights may be negotiated between the provider of data agent 112 and the provider of the application needing access to the data. This may be based, as discussed above, upon the data necessary for the application to properly operate such that the application may be restricted to only that data necessary for the application to properly operate. In other embodiments, the provider of the application may be able to select from a menu of data that may be available.

In other embodiments, the user may be able to control the data acquisition rights available to the application through data agent 112. This may be accomplished through settings on the computing device that may be associated with the respective application. This setting may enable a user to allow or restrict access based upon, for example, the benefit to the user in allowing the access. For instance, if the application were a gesture based application that only needs access to a wire frame representation, as discussed above, the performance of the application may be increased if the application has access to the data stream from the camera as opposed to requiring middleware to process the image and provide the wire frame to the application.

The data acquisition rights may, in some embodiments, be determined dynamically rather than being statically defined. In these embodiments, the data acquisition rights may change depending on a change of context for the user and/or device. For example, an application may have access to a location of the device unless, for example, the device is at the home of the user where the location may be further restricted by the data acquisition rights. In some embodiments, the data acquisition rights may be determined through certain delimiters based upon, for example, location, time period, activity (e.g. running, sleeping, golfing, etc.) or application use (e.g. gaming, navigation, content streaming, etc.). For instance, a specific exercise application may only need access to data while the user is exercising, which may be determined based upon activity, e.g. running, user's location, e.g. while the user is at a gym, and/or if another application is executing, e.g. a heart rate monitor. It will be appreciated that these delimiters may be defined in the data acquisition rights utilizing Boolean operators to determine data acquisition rights based upon any number of, or combination of, such delimiters.

The application executing on the computing device may be enabled to access the data through any number of means. For example, the application may register with the data agent 112 upon installation of the application. This registration process may, in some embodiments, involve providing the data agent 112 with an encryption key that may be embedded into the application which allows access to the necessary data through the data agent 112. In other embodiments, the application may be provided with a password, or another authentication mechanism, that may enable access to the data.

In addition to accessing the data in local data store 110, in some embodiments, the applications executing on computing device 100 may provide data to local data store 100. App 2 may, for instance, access image data from a camera of computing device 100, but may process that image data and provide additional data which may be stored in local data store or provided directly to another application executing on computing device 100. In some embodiments, this data may be provided to other applications for the other applications processing needs. For example, the processing of the image data provided by App 2 may correlate portions of the image data with a store of images, locally or remotely accessed by App 2, which may then be made available for App 1 to process.

Figure 2:
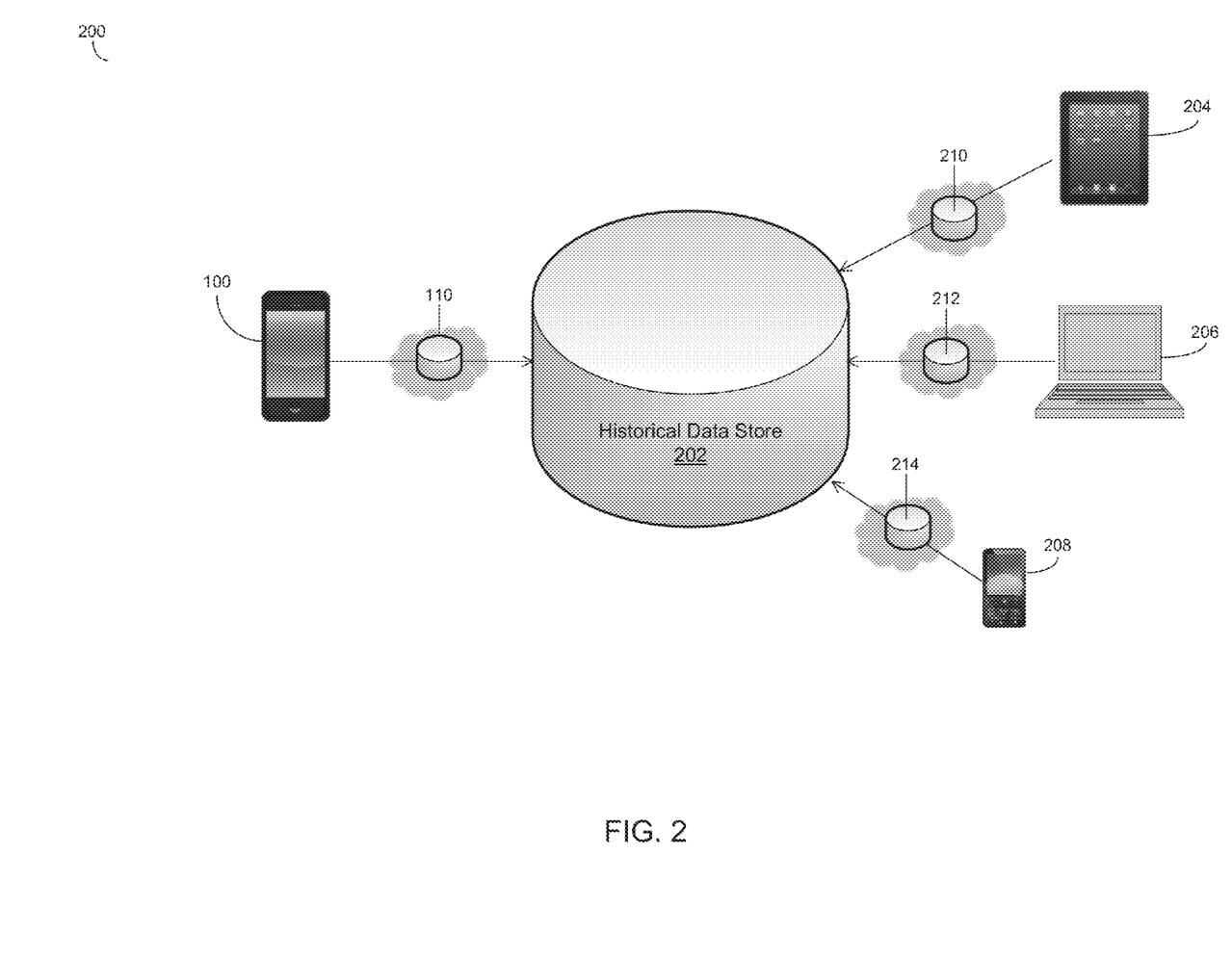
FIG. 2 depicts an illustrative computing environment, according to some embodiments of the present disclosure.

In some embodiments, data agent 112 may periodically transmit a copy of working data to a remote historical data store, such as that depicted in FIG. 2, for categorization and/or correlation with like kind data from other devices of the same or other users. Data agent 112 may accomplish the periodic transmission using communication module 114. In some embodiments the working data may be categorized and correlated with other working data by the historical data store.

While only two applications may be depicted as executing on computing device 100, it will be appreciated that any number of computing applications may be executing on computing device 100 and interacting with data agent 112. Furthermore, while depicted herein as a smartphone, it will be appreciated that computing device 100 may be any computing device without departing from the scope of this disclosure, including, but not limited to a smartphone, tablet, laptop or desktop computer, video game system, smart television, smart appliance, or any other computing device capable of carrying out the functions described in detail in this disclosure.

FIG. 2 depicts an illustrative computing environment, according to some embodiments of the present disclosure. Computing environment 200 may be composed of a plurality of computing devices, 100 and 204-208, coupled to a historical data store 202 through one or more networks, depicted here as clouds.

As discussed above in reference to FIG. 1, the data agent of computing device 100 may act to periodically transmit working data 110 of device 100 to a historical data store 202. Historical data store 202, in some embodiments, may aggregate and store working data 110 from computing device 100 with working data 210-214 of computing devices 204-208, respectively, and any working data already contained in historical data store 202. In some embodiments, historical data store 202 may also correlate and/or categorize the different sets of working data thereby identifying relationships within the working data of a computing device, e.g. relationships between the data collected by different sensors on the same computing device, as well as identifying relationships of working data between the computing devices. The relationships that may be identified through the correlation and/or categorization may be utilized to perform further analysis of the data that may not be possible on the individual computing devices. In some embodiments, the results of the further analysis may be transmitted back to the local data store of the computing device for further processing and/or utilization by the computing device. For example, where data processing is not as time sensitive, the processing may be performed at the historical data store, e.g. by a middleware process running on the historical data store. Thereafter, the results of the processing may be pulled, upon request of the computing device, or pushed, by the historical data store, back to the computing device for further processing or output.

The historical data store 202, in some embodiments, may be stored on one of client devices 204-208. In addition, any of client devices 204-208 may serve as a backup copy of historical data store 202 in case of hard disk failure or other disruption to the data on a client device or in a cloud-based, or network based, store.

In some embodiments the periodic transmission of the working data to historical data store 202 may occur at a specific time, or time interval, specified for the individual devices. For example, the data agent may attempt to transmit the working data every day at a time when it may not be likely to impact the use of the computing device or on an interval of every 12 hours. In some embodiments, data agent may transfer the working data upon detecting that the computing device has established a connection capable of transmitting the working data to historical data store 202. In other embodiments, the data agent may attempt to transmit the working data to the historical data store 202 whenever the size of the working data exceeds a certain threshold. For instance, the working data may be stored in a buffer of the computing device and once that buffer reaches a set size the data agent will begin transmitting, or attempting to transmit the working data to historical data store 202. In still other embodiments, historical data store 202 could initiate the transfer of the working data by sending a request, or query, to the computing device. In further embodiments, the user may trigger the transmission of the working data to historical data store 202. These embodiments may be utilized in any combination, in conjunction, or individually.

In embodiments, data agent may transmit the working data to historical data store 202 in a secure manner. In some embodiments, the secure manner may entail encryption of the working data prior to transmission of the working data to the historical data store 202. The encryption may be performed by the data agent itself or through another hardware or software encryption mechanism. In some embodiments, the secure manner may entail utilizing a secure protocol such as secure socket layer (SSL), transport layer security (TLS), or hypertext transfer protocol secure (HTTPS), or the like. In some embodiments, data agent may use a digital signature to sign the transmission which may act to confirm the identity of the user and/or computing device. The digital signature may, for example, be based upon a private key associated with the user and/or device which may be verified, for example, by a public key held by the remote recipient. It will be appreciated that any manner of securely transmitting the working data may be used without departing from the scope of this disclosure.

In embodiments, historical data store 202 may correlate the data from each device with the data already contained in historical data store 202 as well as the data received from other computing devices. In some embodiments, this may be accomplished by including a time and/or location stamp for the working data and correlating the data based upon a time when the data may have been generated and/or a location where the data may have been generated. The time and/or location stamps may be integrated into the data records by hardware and/or software mechanisms of the computing device and may take any format so long as the requisite information may be conveyed. In other embodiments, the correlation may be based upon an analysis of the data. For example, if the working data contains audio data, then the audio data may be analyzed and compared with other audio data in historical data store 202 to determine the sounds and/or voices contained in the audio data and may correlate the sounds and/or voices with other data with the same or similar characteristics. These methods of correlation, in some embodiments, may be used in conjunction.

The correlation through analysis may be useful in correlating data from multiple devices to recreate a single group experience. For example, if a group of users were playing a video game where multiple computing devices may be recording sensor data in the working data of the computing devices. Each computing device may later transmit this working data to historical data store 202 where the working data from audio sensors of the computing devices may be utilized to correlate the data from each device with the data from the other devices. This may be based upon an analysis of the audio data that determines the same voices may be present in the audio data of the other devices. In some embodiments, the time and/or location stamps may be utilized to aid in this analysis by narrowing the data set that may need to be analyzed. While audio data may be used in this example, it will be apparent that any data capable of making such a correlation may be used.

In embodiments, historical data store 202 may categorize the working data received from each device. In some embodiments, this may be accomplished by categorizing the data based upon the type and/or format of the data. For example, all audio data may be categorized together. In some embodiments the categorization may be based upon the sensor that produced the data. For example, all data from a camera of the computing device may be categorized together. In still other embodiments, the data may be categorized based upon the user of the device at the time the data was produced. In some embodiments, the data may be further subcategorized based upon any of the above mentioned methods of categorization. For instance, the audio data may have subcategories based upon the format of the data (e.g. MP3, WAV, etc.).

In embodiments, the historical data store 202 may provide access, to a requester, of the data in the historical data store 202 for analysis. The requester may, in some embodiments, be the provider of one of the applications executing on a computing device. In some embodiments, this request may be made to gain additional information on the use of the application. For instance, the provider may notice something, in the data accessible to the application on the computing device, which the provider may want to further investigate. For example, if the application were a gesture based game and the provider notices that there may be some pauses in the game play, then the provider of the application may wish to know what may have been going on that correlated with those pauses. This may provide some context to the pauses. In another example, the provider may wish to analyze the data available to the application in greater detail than the application may have been able to on the computing device, for example to improve the interpretation of gestures during the gesture based game. In other embodiments the requester may be the application executing on the computing device, to gain access to data that may not have been necessary for the immediate processing needs of the application, but nevertheless may be utilized by the application in some manner. In some embodiments, the requester may be the provider of the computing device or a provider of some portion of the computing device and the data requested may be utilized to aid in further understanding of some use or issue with the computing device. For example, the computing device may have encountered a failure and the provider of the computing device may wish to gather some additional contextual information surrounding the failure. In some embodiments, the data agent on the computing device may provide not only local requesters, but also remote requesters access to the local data store, similar to the description above regarding the historical data store. It will be appreciated that any requester is contemplated and the above embodiments are meant for illustrative purposes only.

In some embodiments, the requester may provide a portion, or snippet, of data that the requester had access to previously, for example through an application executing on one of the computing devices. This portion of data may then be correlated with the data in the historical data store 202 to determine a subset of the data applicable to the request. The request for the data may then be fulfilled from this subset of the data.

The access may be based upon similar data acquisition rights to those discussed above in reference to FIG. 1. In some embodiments, the requester may only need access to data from a single sensor of a computing or access to data from similar sensors on different computing devices that may have been correlated as discussed above. In other embodiments, the requester may only need access to a subset, summary or obfuscation of the data contained in historical data store 202. This may be provided in a similar manner to that discussed above with a component similar to the data agent, or other middleware component, implemented for the historical data store 202.

The data acquisition rights may be acquired in a number of ways regardless of whether the data acquisition rights are used to access local data and/or historical data store 202. For example, where historical data store 202 may be provided by a third party vendor or the provider of the computing device platform, the data acquisition rights may be negotiated between the provider and the requester needing access to the data. In other embodiments, the user may be able to control the data acquisition rights available to the requester. This may be accomplished through, for example, an authorization request submitted to the user or authorized by, for example, the user upon installation of a computer application or purchase of the computing device, e.g. an end user license agreement that authorizes the use of the data. In embodiments, the data acquisition rights may vary depending on whether the request is of the local data store or historical data store 202. Therefore, it may be necessary for a requester to acquire data acquisition rights to either or both data sources.

Figure 3:
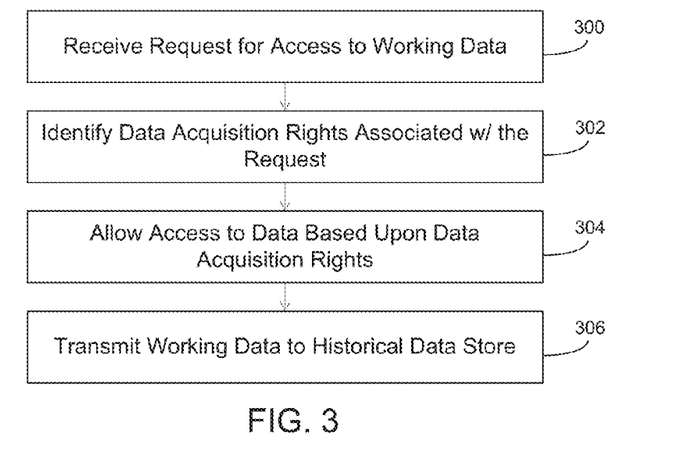
FIG. 3 is a flow chart depicting an illustrative method associated with a data agent of a computing device, according to some embodiments of the present disclosure.

FIG. 3 is a flow chart depicting an illustrative method associated with a data agent of a computing device, according to some embodiments of the present disclosure. The process may begin in block 300 where the data agent receives a request for access to working data, such as working data 110 of FIG. 1. In block 302 data agent may identify the data acquisition rights associated with the request to determine what data access may be needed. This may be accomplished, as discussed above in reference to FIG. 1, by receiving authentication information, such as a password or cryptographic key, which the data agent may use to identify the associated rights. In some embodiments, the data acquisition rights may be able to be determined from information stored on a computing device on which the data agent may be executing. In other embodiments, the data agent may need to access a remote resource to determine the data acquisition rights. After determining the data acquisition rights the data agent may allow access to the data based upon the data acquisition rights. As discussed above in reference to FIG. 1, the data acquisition rights may work to restrict access to a subset of the working data, a summary of working data, or obfuscation of the working data. In block 306 data agent may transmit a copy of the working data to a historical data store, such as that described in reference to FIG. 2, above. While the transmission of the working data is depicted here as occurring after a request for the data contained in the local data store, it will be appreciated that the transmission of the local data store to the historical data store may not be contingent upon such a request and the local data store may be transmitted to the historical data store regardless of whether any such request has occurred. In some embodiments, the working data may be deleted after the transmission to the historical data store. In other embodiments the working data may persist for a period after the transmission. As discussed in greater detail in reference to FIG. 2, above, the transmission may occur at a specific time, or interval of time, upon the data agent detecting a data connection sufficient to transmit the working data, upon the working data exceeding a predetermined threshold size, upon request from the historical data store, and/or upon request of the user of the computing device.

Figure 4:
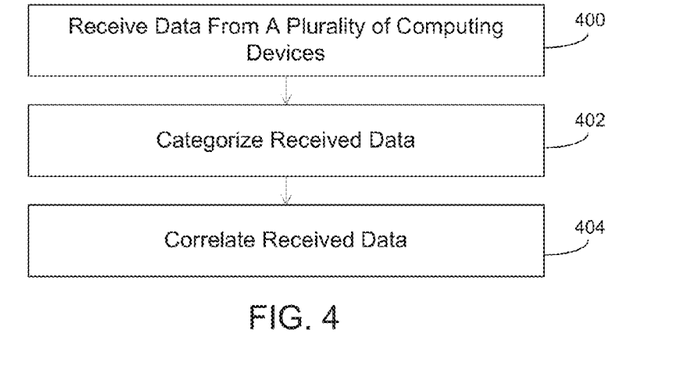
FIG. 4 is a flow chart depicting an illustrative method associated with a historical data store server of a computing environment 100 of FIG. 1.

FIG. 4 is a flow chart depicting an illustrative process associated with a historical data store of a computing environment 100 of FIG. 1. The process may begin at block 400 where the historical data store receives data from a plurality of computing devices. In block 402 the received data may be categorized with the data of the other devices and data already contained in the historical data store. The categorization process is discussed in further detail with respect to FIG. 2, above. In block 404 the received data may be correlated with the data of the other devices, of the same or different users, and data already contained in the historical data store, discussed in further detail with respect to FIG. 2, above.

Figure 5:
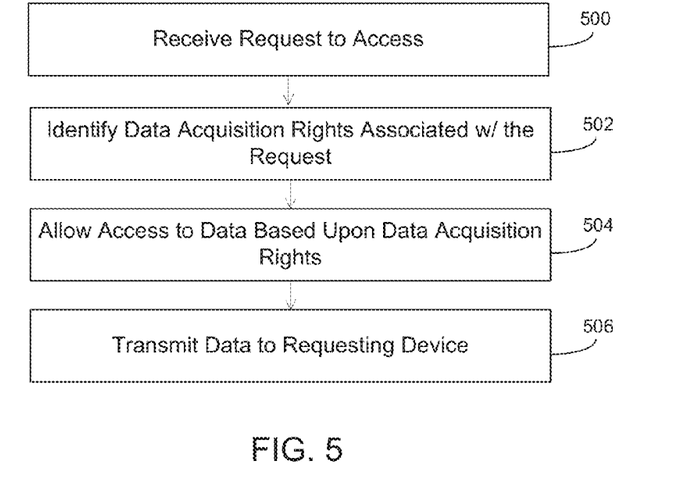
FIG. 5 is a flow chart depicting an illustrative process associated with a historical data store receiving a request for data stored in the historical data store.

FIG. 5 is a flow chart depicting an illustrative process associated with a historical data store receiving a request for data. The process may begin in block 500 where the historical data store receives a request for access to stored data. In block 502 the historical data store may identify the data acquisition rights associated with the request to determine what data access is needed. This may be accomplished, as discussed above in reference to FIG. 1 and FIG. 2, by receiving authentication information, such as a password or cryptographic key, which the historical data store may use to identify the associated rights. In some embodiments, the data acquisition rights may be able to be determined from information stored on the historical data store. In other embodiments, the historical data store may need to access a remote resource to determine the data acquisition rights. In block 504, after determining the data acquisition rights, the historical data store may allow access to the data based upon the data acquisition rights. In block 506, the historical data store may transmit the requested data to the requesting device. As discussed above in reference to FIG. 2, the data acquisition rights may work to restrict access to a subset of the data stored in the historical data store, a summary of the data stored in the historical data store, and/or obfuscation of the data stored in the historical data store.

Figure 6:
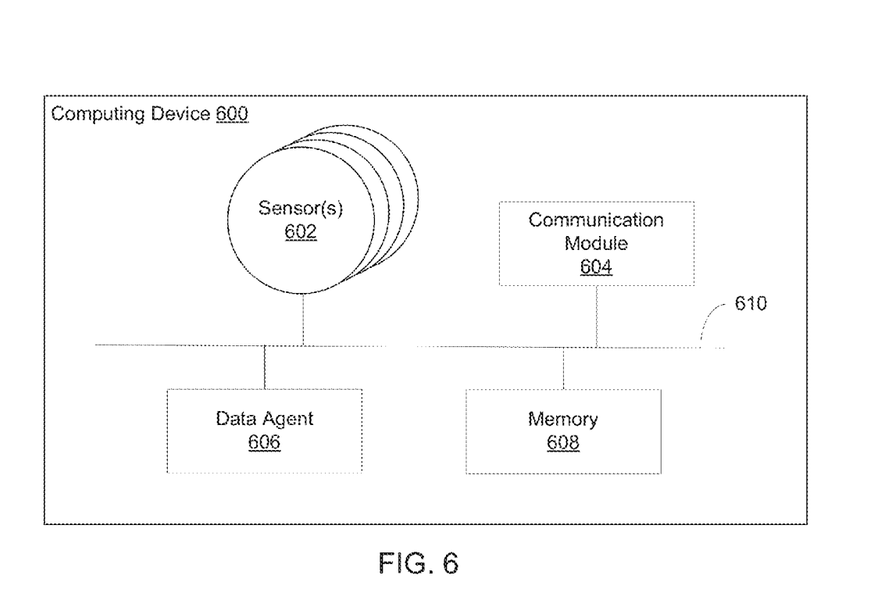
FIG. 6 depicts an illustrative computing device, according to some embodiments of the present disclosure.

FIG. 6 depicts an illustrative computing device 600, according to some embodiments of the present disclosure. Computing device 600 may include a plurality of sensors 602, a communication module 604, such as a network interface card, a memory 608, and a data agent 606 all connected together through bus 610. Data agent 606 may, in some embodiments, comprise one or more processors coupled to one or more computer-readable storage media. The one or more computer-readable storage media may contain instructions which, when executed by the one or more processors, may cause computing device 600 to perform one or more of the computing device processes described above. In other embodiments, data agent 606 may be composed of any number of hardware and/or software components that cause computing device 600 to perform one or more of the computing device processes described above. The one or more processors may be any type of single or multi-core processor, or any combination thereof. This disclosure is equally applicable regardless of type and/or number of processors.

Figure 7:
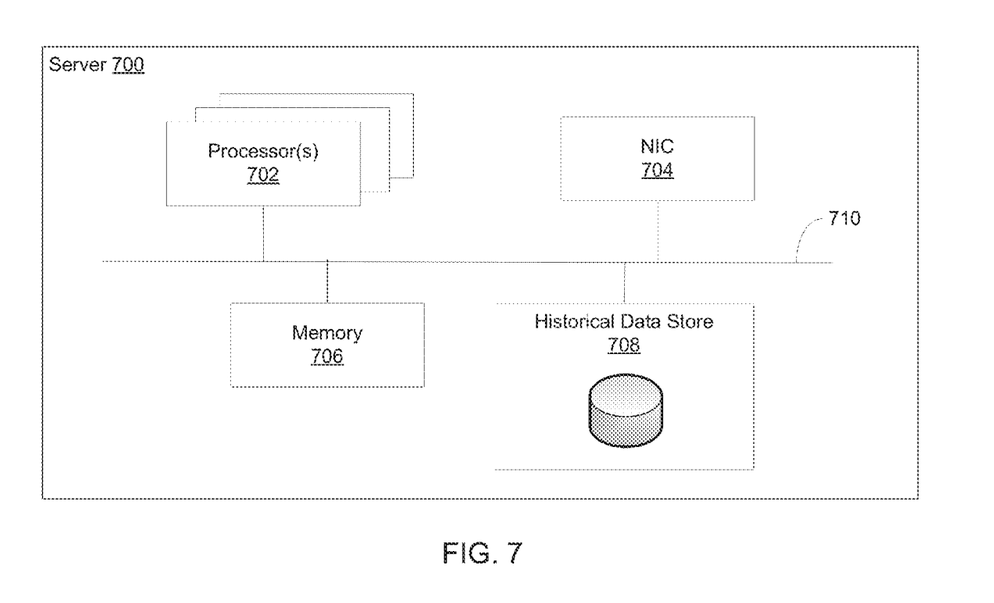
FIG. 7 depicts an illustrative server providing a historical data store, according to some embodiments of the present disclosure.

FIG. 7 depicts an illustrative server providing a historical data store, according to some embodiments of the present disclosure. Server 700 may comprise processor(s) 702, network interface card(s) (NIC) 704, memory 706, and historical data store 708. Historical data store 708 illustrated in FIG. 7 includes the storage for storing the received data, as well the logic for performing the earlier described operation associated with receiving data from client devices, categorizing and/or correlating the received data, and responding to a request for the categorized and/or correlated data. Processor(s) 702, NIC 704, memory 706, and historical data store 708 may all be coupled together utilizing system bus 710.

Processor(s) 702 may, in some embodiments, be a single processor or, in other embodiments, may be comprised of multiple processors. In some embodiments the multiple processors may be of the same type, i.e. homogeneous, or they may be of differing types, i.e. heterogenous and may be include any type of single or multi-core processors. This disclosure is equally applicable regardless of type and/or number of processors. In embodiments, NIC 704 may be used by server 700 to access the networks depicted in FIG. 2 above. In embodiments, NIC 704 may be used to access a wired or wireless network; this disclosure is equally applicable. In embodiments, memory 706 may be any type of computer-readable storage medium or any combination of differing types of computer-readable storage media. For example, in embodiments, memory 706 may include, but is not limited to, a solid state drive (SSD), a magnetic or optical disk hard drive, volatile or non-volatile, dynamic or static random access memory, flash memory, or any multiple or combination thereof. In embodiments, memory 706 may store instructions which, when executed by processor(s) 702, cause server 700 to perform one or more operations of the process described above in reference to the historical data store.

Embodiments of the disclosure can take the form of an entirely hardware embodiment, an entirely software embodiment or an embodiment containing both hardware and software elements. In various embodiments, software, may include, but is not limited to, firmware, resident software, microcode, and the like. Furthermore, the disclosure can take the form of a computer program product accessible from a computer-usable or computer-readable medium providing program code for use by or in connection with a computer or any instruction execution system. As used herein, module may refer to hardware, software, or a combination of hardware and software.

For the purposes of this description, a computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a USB drive, a random access memory (RAM), a read-only memory (ROM), a rigid magnetic disk and an optical disk. Current examples of optical disks include compact disk-read only memory (CD-ROM), compact disk-read/write (CD-R/W) and DVD.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the disclosure. This application is intended to cover any adaptations or variations of the embodiments discussed herein. Therefore, it is manifestly intended that the embodiments of the disclosure be limited only by the claims and the equivalents thereof.

EXAMPLES

Example 1 is a computing device for managing data including: a plurality of sensors; one or more memory modules; a communication module; a Data Agent, coupled to the one or more memory modules, the communication module, and the plurality sensors, configured to: provide access to data received by the Data Agent from the plurality of sensors to one or more applications executing on the computing device; and request, on behalf of one or more applications executing on the computing device, access to data in a historical data store, wherein the historical data store contains categorized or correlated data from one or more other devices.

Example 2 may include the subject matter of Example 1, wherein the access to data received by the Data Agent from the plurality of sensors is restricted, by the Data Agent, to a subset of the data received from the plurality of sensors and the subset of the data is determined based at least in part upon data acquisition rights associated with the one or more applications.

Example 3 may include the subject matter of Example 1, wherein to provide access to data received by the Data Agent from the plurality of sensors further includes obfuscation, by the Data Agent, of at least a subset of the data received from the plurality of sensors wherein the subset of the data is determined based at least in part upon data acquisition rights associated with the one or more applications.

Example 4 may include the subject matter of Example 2 or 3, wherein the one or more applications are associated with varying levels of data acquisition rights.

Example 5 may include the subject matter of any one of Examples 1-3, wherein the local data is stored in a buffer of the computing device and the Data Agent is further configured to transmit a copy of the data to a remote historical data store based upon at least one of the following: a predetermined time interval; detection of a network connection by the computing device; or a determination that the buffer has reached a threshold size manual activation by the user; or query from the remote historical data store.

Example 6 may include the subject matter of any one of Examples 1-3, wherein the Data Agent is further configured to correlate the data from one sensor with the data of the other sensors based at least in part upon a time and location stamp.

Example 7 may include the subject matter of any one of Examples 1-3, wherein the Data Agent is further configured to encrypt the copy of the data prior to transmission of the copy of the local data to the remote historical data store.

Example 8 may include the subject matter of any one of Examples 1-3, wherein the Data Agent is further configured to periodically transmit, via the communication module, a copy of the data from the plurality of sensors to a remote historical data store to be categorized or correlated with data from computing devices associated with one or more other users for further processing.

Example 9 is a computer-implemented method for correlating data of computing devices including: receiving, by a server, data from a plurality of computing devices correspondingly associated with a plurality of users, wherein the data of a computing device contains at least data from one or more sensors of the computing device; storing the data in a historical data store; and correlating, by the server, the data.

Example 10 may include the subject matter of Example 9, further including categorizing, by the server, the data.

Example 11 may include the subject matter of Example 9, wherein the correlating is based in part upon a time or location stamp contained in the data.

Example 12 may include the subject matter of any one of Examples 9-11, further including: receiving, by the server, a request for access to data in the historical data store; and providing, by the server, in response to the request, access to a subset of the data in the historical data store, wherein the subset is determined by data acquisition rights associated with the request.

Example 13 may include the subject matter of Example 12, wherein the request includes at least a portion of local data from a computing device and further comprising correlating, by the server, the portion of local data with data contained in the historical data store to retrieve for further analysis.

Example 14 may include the subject matter of any one of Examples 9-11, wherein the categorizing of the data is based in part upon one or more of: a type associated with the data: the user associated with the computing device; or a type of sensor that produced the data.

Example 15 is a computing apparatus for correlating data of a plurality of computing devices including: means for receiving data from the plurality of computing devices, wherein the data of a computing device contains at least data from one or more sensors of the computing device; means for storing the data in a historical data store; and means for correlating the data.

Example 16 may include the subject matter of Example 15, further including means for categorizing the data.

Example 17 may include the subject matter of Example 15, wherein the correlating is based in part upon a time or location stamp contained in the data.

Example 18 may include the subject matter of any one of Examples 15-17, further includes: means for receiving a request for access to data in the historical data store, and means for providing, in response to the request, access to a subset of the data in the historical data store, wherein the subset is determined by data acquisition rights associated with the request.

Example 19 may include the subject matter of Example 18, wherein the request includes at least a portion of local data from a computing device and further comprising correlating, by the server, the portion of local data with data contained in the historical data store to retrieve for further analysis.

Example 20 may include the subject matter of any one of Examples 15-17, wherein the categorizing of the data is based in part upon one or more of: a type associated with the data; the user associated with the computing device; or a type of sensor that produced the data.

Example 21 is a computing apparatus for managing local data of a computing device including: means for providing access of local data to one or more applications executing on the computing device for contemporaneous processing by the one or more applications, wherein the local data is associated, at least in part, with one or more sensors of the computing device; and means for transmitting a copy of the local data to a remote historical data store to be categorized or correlated with data from other computing devices.

Example 22 may include the subject matter of Example 21 further including means for restricting the access of local data to a subset of the local data based at least in part upon data acquisition rights associated with the one or more applications.

Example 23 may include the subject matter of Example 21 further including means for providing a level of obfuscation to at least a portion of the local data when providing access of the local data and the level of obfuscation is based at least in part upon data acquisition rights associated with the one or more applications.

Example 24 may include the subject matter of Example 22 or 23, wherein the one or more applications are associated varying levels of data acquisition rights.

Example 25 may include the subject matter of any one of Examples 21-23, wherein the local data is stored in a buffer of the computing device and further including means for transmitting a copy of the data to a remote historical data store based upon at least one of the following: a predetermined time interval; detection of a network connection by the computing device; a determination that the buffer has reached a threshold size; manual activation by the user; or query from the remote historical data store.

Example 26 may include the subject matter of any one of Examples 21-23, wherein the local data is associated with a plurality of sensors and contains at least one of a time or location stamp and further including means for correlating the data from one sensor with the data of the other sensors based at least in part upon the time and location stamp.

Example 27 may include the subject matter of Example 22, further including means for encrypting the copy of the local data prior to transmission of the copy of the local data to the remote historical data store.

Example 28 may include the subject matter of any one of Examples 21-23, further including means for requesting, on behalf of one or more applications executing on the computing device, access to data in the historical data store.

Example 29 is at least one computer-readable storage medium having instructions stored thereon, wherein the instructions, in response to execution by a computing device associated with a user, provide the computing device with a Data Agent configured to: provide access of local data to one or more applications executing on the computing device for contemporaneous processing by the one or more applications, wherein the local data is associated, at least in part, with one or more sensors of the computing device; and transmit a copy of the local data to a remote historical data store to be categorized or correlated with data from other computing devices.

Example 30 may include the subject matter of Example 29, wherein the Data Agent is further configured, to restrict the access of local data to a subset of the local data based at least in part upon data acquisition rights associated with the one or more applications.

Example 31 may include the subject matter of Example 29, wherein the Data Agent is further configured, to provide a level of obfuscation to at least a portion of the local data when providing access of the local data and the level of obfuscation is based at least in part upon data acquisition rights associated with the one or more applications.

Example 32 may include the subject matter of Example 30 or 31, wherein the one or more applications are associated varying levels of data acquisition rights.

Example 33 may include the subject matter of any one of Examples 29-31, wherein the local data is stored in a buffer of the computing device and the Data Agent is further configured to transmit a copy of the data to a remote historical data store based upon at least one of the following: a predetermined time interval; detection of a network connection by the computing device; a determination that the buffer has reached a threshold size; manual activation by the user; or query from the remote historical data store.

Example 34 may include the subject matter of any one of Examples 29-31, wherein the local data is associated with a plurality of sensors and contains at least one of a time or location stamp and the Data Agent is further configured to correlate the data from one sensor with the data of the other sensors based at least in part upon the time and location stamp.

Example 35 may include the subject matter of any one of Examples 29-31, wherein the Data Agent is further configured to encrypt the copy of the local data prior to transmission of the copy of the local data to the remote historical data store.

Example 36 may include the subject matter of any one of Examples 29-31, wherein the Data Agent is further configured to request, on behalf of one or more applications executing on the computing device, access to data in the historical data store.

Example 37 is at least one computer-readable storage medium having instructions stored thereon, wherein the instructions, in response to execution by a server, cause the server to: receive data from a plurality of computing devices, wherein the data of a computing device contains at least data collected from one or more sensors of the computing device; store the data in a historical data store; and categorize and correlate the data stored in the historical data store.

Example 38 may include the subject matter of Example 37, wherein the data contain at least one of a time or location stamp, and correlation of the data is based at least in part upon the time or location stamp.

Example 39 may include the subject matter of Example 37, wherein the instructions, in response to execution by the server, further cause the server to receive a request for access to data in the historical data store, and in response, provide access to a subset of the data in the historical data store, wherein the subset is determined by data acquisition rights associated with the request.

Example 40 may include the subject matter of Example 39, wherein the request includes at least a portion of local data from a computing device and the instructions, in response to execution by the server, further cause the server to correlate the portion of local data with data contained in the historical data store to retrieve for further analysis.

Example 41 may include the subject matter of any one of Examples 37-39, wherein the categorization is based in part upon one or more of; a type associated with the data; the user associated with the computing device; or a type of sensor that produced the data.

Example 42 is a computing device comprising means for performing the computer-implemented method of any one of Examples 9-14.

Example 43 is a computer-readable storage medium comprising instructions, which when executed by a computing device, cause the computing device to perform the computer-implemented method of any one of Examples 9-14.

What is claimed is:

1. At least one computer-readable storage medium having instructions stored thereon, wherein the instructions, in response to execution by a computing device associated with a user, provide the computing device with a Data Agent to:
    manage access to local data by one or more applications executing on the computing device, based at least in part upon data acquisition rights associated with the one or more applications, for contemporaneous processing by the one or more applications, wherein the local data are simultaneously captured by sensors of the computing device; and
    transmit a copy of the local data to a remote historical data store to be categorized or correlated with data from a plurality of other computing devices correspondingly associated with a plurality of other users;
    wherein when the Data Agent is to restrict access by one of the one or more applications to only portions of the local data, as part of the management of access, only obfuscated version data is accessible by the one of the one or more applications, wherein the Data Agent is to generate the obfuscated version data based on the local data, the obfuscated version data including the only portions of the local data, where access is permitted, and which excludes other portions of the local data, where access is restricted, and wherein the only portions of the local data where access is permitted comprise only portions of the local data that the one of the one or more applications requires to properly operate and has permission to access.

2. The at least one computer-readable storage medium of claim 1, wherein the one or more applications are associated with varying levels of data acquisition rights.

3. The at least one computer-readable storage medium of claim 1, wherein the local data is stored in a buffer of the computing device and the Data Agent is to further transmit a copy of the data to a remote historical data store based upon at least one of the following:
    a predetermined time interval;
    detection of a network connection by the computing device;
    a determination that the buffer has reached a threshold size;
    manual activation by the user; or
    query from the remote historical data store.

4. The at least one computer-readable storage medium of claim 1, wherein the local data associated with a plurality of sensors contain at least one of a time or location stamp, and the Data Agent is to further correlate the data from one sensor with the data of other sensors based at least in part upon the time or location stamp.

5. The at least one computer-readable storage medium of claim 1, wherein the Data Agent is to further encrypt the copy of the local data prior to transmission of the copy of the local data to the remote historical data store.

6. The at least one computer-readable storage medium of claim 1, wherein the Data Agent is to further request, on behalf of one or more applications executing on the computing device, access to data in the historical data store.

7. The at least one computer-readable storage medium of claim 1, wherein the Data Agent is to process the local data that is raw data to derive the only portions of the local data included in the obfuscated version data, and wherein the only portions of the local data included in the obfuscated version data based on the processing of the local data that is raw data is to cause proper execution of the one of the one or more applications.

8. At least one computer-readable storage medium having instructions stored thereon, wherein the instructions, in response to execution by a server, cause the server to:
    receive data from a plurality of computing devices correspondingly associated with a plurality of users, wherein the plurality of computing devices are remote from the server and the data of a first of the plurality of computing devices contains at least data simultaneously captured by a plurality of sensors of the first computing device, wherein contemporaneous access to the sensor captured data by an application of the first computing device is managed based on access right of the application; and wherein when the application, as part of the management of access, is restricted to portions of the sensor captured data, only obfuscated version data is accessible by the application, the obfuscated version data generated based on the sensor captured data, the obfuscated version data only including the portions of the sensor captured data and excluding other portions of the sensor captured data, and wherein the portions of the sensor captured data included in the obfuscated version data comprise only a subset of the sensor captured data that the application requires to properly operate and has permission to access;
    store the data in a historical data store; and
    manage the data stored in the historical data store across the plurality of users.

9. The at least one computer-readable storage medium of claim 8, wherein the data contain at least one of a time or location stamp, and manage the data is based at least in part upon the time or location stamp.

10. The at least one computer-readable storage medium of claim 8, wherein the instructions, in response to execution by the server, further cause the server to receive a request for access to data in the historical data store, and in response, provide access to a subset of the data in the historical data store, wherein the subset is determined by data acquisition rights associated with the request.

11. The at least one computer-readable storage medium of claim 10, wherein the request is for at least a portion of local data of one of the computing devices and the instructions, in response to execution by the server, further cause the server to identify the portion of local data among data contained in the historical data store.

12. The at least one computer-readable storage medium of claim 8, wherein manage the data is based in part upon one or more of:
 a type associated with the data;
 the user associated with the computing device; or
 a type of sensor that produced the data.

13. The at least one computer-readable storage medium of claim 8, further including instructions, in response to execution by the server, cause the server to: process the portions of the sensor captured data that is raw data to derive the only the subset of the sensor captured data included in the obfuscated version data, and wherein the only the subset of the sensor captured data included in the obfuscated version data based on the processing of the portions of the sensor captured data that is raw data is to cause proper execution of the application.

14. A computing device comprising:
 a plurality of sensors;
 one or more memory modules;
 a communication module;
 a Data Agent, coupled to the one or more memory modules, the communication module, and the plurality of sensors, to:
  manage contemporaneous access to data simultaneously received by the Data Agent from the plurality of sensors by one or more applications executing on the computing device, based at least in part upon data acquisition rights associated with the one or more applications, wherein when the Data Agent is to restrict access by one of the one or more applications to only portions of the local data, as part of the management of access, only obfuscated version data is accessible by the one of the one or more applications, wherein the Data Agent is to generate the obfuscated version data based on the local data, the obfuscated version data including the only portions of the local data, where access is permitted, and which excludes other portions of the local data, where access is restricted, and wherein the only portions of the local data where access is permitted comprise only portions of the local data that the one of the one or more applications requires to properly operate and has permission to access; and
  request, on behalf of one or more applications executing on the computing device, access to data in a remote historical data store, wherein the historical data store contains categorized or correlated data captured by sensors of the computing device and a plurality of other computing devices.

15. The computing device of claim 14, wherein the one or more applications are associated with varying levels of data acquisition rights.

16. The computing device of claim 14, wherein the data is stored in a buffer of the computing device and the Data Agent is to further transmit a copy of the data to a remote historical data store based upon at least one of the following:
 a predetermined time interval;
 detection of a network connection by the computing device;
 a determination that the buffer has reached a threshold size manual activation by the user; or
 query from the remote historical data store.

17. The computing device of claim 14, wherein the Data Agent is to further correlate the data from one sensor with the data of the other sensors based at least in part upon a time or location stamp.

18. The computing device of claim 14, wherein the Data Agent is to further encrypt a copy of the data prior to transmission of the copy of the local data to the remote historical data store.

19. The computing device of claim 14, wherein the Data Agent is to further periodically transmit, via the communication module, a copy of the data from the plurality of sensors to a remote historical data store to be categorized or correlated with data from computing devices associated with one or more other users for further processing.

20. The computing device of claim 14, wherein the Data Agent is to process the local data that is raw data to derive the only portions of the local data included in the obfuscated version data, and wherein the only portions of the local data included in the obfuscated version data based on the processing of the local data that is raw data is to cause proper execution of the one of the one or more applications.

21. A computer-implemented method comprising:
 receiving, by a server, data from a plurality of computing devices correspondingly associated with a plurality of users, wherein the plurality of computing devices are remote from the server and the data of a first of the plurality of computing devices contains at least data simultaneously captured by a plurality of sensors of the first computing device; wherein contemporaneous access to the sensor captured data by an application of the first computing device is managed based on access right of the application; and wherein when the application, as part of the management of access, is restricted to portions of the sensor captured data, only obfuscated version data is accessible by the application, the obfuscated version data generated based on the sensor captured data, the obfuscated version data only including the portions of the sensor captured data and excluding other portions of the sensor captured data, and wherein the portions of the sensor captured data included in the obfuscated version data comprise only a subset of the sensor captured data that the application requires to properly operate and has permission to access;
 storing the data in a historical data store; and
 managing, by the server, the data across the plurality of users.

22. The computer-implemented method of claim 21, further comprising categorizing, by the server, the data.

23. The computer-implemented method of claim 21, further comprising:
 receiving, by the server, a request for access to data in the historical data store, and providing, by the server, in response to the request, access to a subset of the data in the historical data store, wherein the subset is determined by data acquisition rights associated with the request.

24. The computer-implemented method of claim 23, wherein the request is for at least a portion of local data of one of the computing devices and the method further comprises identifying, by the server, the portion of local data among data contained in the historical data store.

25. The computer-implemented method of claim 21, further comprising processing the portions of the sensor captured data that is raw data to derive the only the subset of the sensor captured data included in the obfuscated version data, and wherein the only the subset of the sensor captured data included in the obfuscated version data based on the processing of the portions of the sensor captured data that is raw data is to cause proper execution of the application.

* * * * *